(12) United States Patent
Liu

(10) Patent No.: US 8,985,473 B2
(45) Date of Patent: Mar. 24, 2015

(54) WATER TEMPERATURE REGULATING VALVE

(76) Inventor: Teng-Lung Liu, Taipei (TW)

(*) Notice: Subject to any disclaimer, the term of this patent is extended or adjusted under 35 U.S.C. 154(b) by 692 days.

(21) Appl. No.: 13/354,830

(22) Filed: Jan. 20, 2012

(65) Prior Publication Data

US 2013/0186488 A1 Jul. 25, 2013

(51) Int. Cl.
| G05D 23/13 | (2006.01) |
| B67D 1/00 | (2006.01) |
| B67D 1/08 | (2006.01) |
| B67D 1/12 | (2006.01) |
| F16K 11/074 | (2006.01) |
| B67D 3/00 | (2006.01) |

(52) U.S. Cl.
CPC .......... *F16K 11/0743* (2013.01); *B67D 1/0036* (2013.01); *B67D 1/0888* (2013.01); *B67D 1/1277* (2013.01); *B67D 1/1295* (2013.01); *B67D 3/0029* (2013.01); *B67D 2210/00099* (2013.01)
USPC ............. 236/12.1; 236/12.11; 236/12.12; 137/605; 137/625.15; 137/625.13

(58) Field of Classification Search
USPC .................. 236/12.1, 12.11, 12.12; 137/605, 137/625.15, 625.13
See application file for complete search history.

(56) References Cited

U.S. PATENT DOCUMENTS

| 6,056,201 A * | 5/2000 | Ta .............................. 236/12.12 |
| 2007/0028971 A1* | 2/2007 | Wagner .................... 137/625.15 |
| 2009/0101211 A1* | 4/2009 | Klehr et al. ....................... 137/1 |

* cited by examiner

*Primary Examiner* — Jonathan Bradford
(74) *Attorney, Agent, or Firm* — Egbert Law Offices, PLLC

(57) ABSTRACT

A regulating valve has a dome, a discharge sheet and a flow deflector. The dome has a base and a circumferential wall. The discharge sheet and the flow deflector are set in the dome in sequence. A discharge portion, a cold water portion, a hot water portion and a warm water portion are set on the base. A discharge slot, a cold water slot, a hot water slot and a warm water slot are set on the discharge sheet correspondingly. A guide slot is extended outwards from the center of the circle on the surface of the flow deflector. The end point of the center of the guide slot is set correspondingly to the discharge slot. When the flow deflector is rotated, there may occur either of a water shutdown state, or a hot, lukewarm, warm, chilly or cold water discharge state, enabling to switch water discharge efficiently.

9 Claims, 5 Drawing Sheets

WATER TEMPERATURE REGULATING VALVE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to an element of a water dispenser, and more particularly to a regulating valve which is used for regulating the temperature of yielding water from the water dispenser.

2. Description of Related Art Including Information Disclosed Under 37 CFR 1.97 and 37 CFR 1.98

A water dispenser is generally equipped with a heater and a condenser, and furthermore with a hot water barrel, a cold water barrel and a mixing tank for storing hot and cold water. Of which, hot and cold water entering into the mixing tank could form warm water, which could be taken by a plurality of faucets or a water discharge device. Hence, such faucets or water discharge devices shall be adapted to hot, warm and cold water. The water discharge device could control the discharge of hot, warm and cold water by a plurality of magnetic valves.

Thus, to overcome the aforementioned problems of the prior art, it would be an advancement if the art to provide an improved structure that can significantly improve the efficacy.

Therefore, the inventor has provided the present invention of practicability after deliberate design and evaluation based on years of experience in the production, development and design of related products.

BRIEF SUMMARY OF THE INVENTION

The primary objective of the present invention is to provide a regulating valve of simple construction, which allows a discharge sheet and a flow deflector of a special pattern to be set in a dome. When the flow deflector is rotated in relation to the discharge sheet, it is possible to switch rapidly the discharge states, thus reducing substantially the manufacturing and maintenance cost with its simple construction.

Another objective of the present invention is to provide a regulating valve of simple construction, which allows a plurality of slots that are designed on the discharge sheet correspondingly to different water resources, and also mated with the guide slot of the flow deflector through rotation, so as to output water of various temperature, thus improving greatly the convenience in use.

A regulating valve of the present invention is set into a water dispenser, and connected separately with cold, hot and warm water sources, so as to switch the yielding water temperature. It comprises: a dome, which comprises of: a base, made of a round sheet provided with a discharge portion, a cold water portion, a hot water portion and a warm water portion. The discharge portion is set at the center of the base, while the cold, hot and warm water portions are separately set on the periphery of the discharge portion. Moreover, the cold water portion is connected correspondingly with the cold water source, the hot water portion connected correspondingly with the hot water source, and the warm water portion connected correspondingly with the warm water source. A circumferential wall is set around the base such that a holding space is formed. A discharge sheet is set in the holding space of the dome and attached closely to the base. A discharge slot, a cold water slot, a hot water slot and a warm water slot are separately set on the discharge sheet correspondingly to the discharge portion, the cold water portion, the hot water portion and the warm water portion. A flow deflector is set in the holding space of the dome and attached pivotally to the other side of the discharge sheet. A guide slot is extended outwards from the center of the circle on the surface of the flow deflector. The end point of the center of the guide slot is set correspondingly to the discharge slot. When the flow deflector is rotated, there may occur either of a water shutdown state, a hot water discharge state, a lukewarm water discharge state, a warm water discharge state, a chilly water discharge state and a cold water discharge state.

In a preferred embodiment of the present invention, when the flow deflector is not rotated, the guide slot is only connected with the discharge slot to cause a water shutdown state. When the flow deflector is rotated, the guide slot is connected with the discharge slot and the hot water slot to cause hot water discharge state. Or, when the flow deflector is rotated, the guide slot is connected with the discharge slot, the warm water slot and the hot water slot to cause lukewarm water discharge state. Or, when the flow deflector is rotated, the guide slot is connected with the discharge slot and the warm water slot to cause warm water discharge state. Or, when the flow deflector is rotated, the guide slot is connected with the discharge slot, the warm water slot and the cold water slot to cause chilly water discharge state. Or, when the flow deflector is rotated, the guide slot is connected with the discharge slot and the cold water slot to cause cold water discharge state. Furthermore, since the discharge slot of the discharge sheet is circularly set opposite to the discharge portion, the cold water slot and hot water slot are arranged symmetrically at both sides of the discharge slot. Moreover, the cold and hot water slots are set in a sickle-shaped pattern, the warm water slot is set between the discharge slot, the cold water slot and the hot water slot. The warm water slot is set in a falcate pattern. Thus, when the flow deflector is rotated such that water shutdown state is switched to hot water discharge state, the mating area X of the guide slot and the hot water slot increases gradually from 0. When the flow deflector is rotated from hot water discharge state to lukewarm water discharge state, the mating area X of the guide slot and the hot water slot decreases gradually, meanwhile the mating area Y of the guide slot and the warm water slot increases gradually. When the lukewarm water discharge state is switched to warm water discharge state, the mating area X of the guide slot and the hot water slot decreases to 0, while the mating area Y of the guide slot and the warm water slot increases to maximum value. When warm water discharge state is switched to chilly water discharge state, the mating area Y of the guide slot and the warm water slot decreases gradually, whilst the mating area Z of the guide slot and the cold water slot increases gradually. When chilly water discharge state is switched to cold water discharge state, the mating area Y of the guide slot and the warm water slot decreases to 0, whilst the mating area Z of the guide slot and the cold water slot increases to maximum value.

In a preferred embodiment of the present invention, the regulating valve also comprises a motor. An actuating axle of the motor is connected with the center of circle of the flow deflector, so as to drive electrically rotation of the flow deflector. Moreover, the regulating valve also comprises a control module, which is connected electrically with the motor. The control module is provided with a plurality of sensors, which are set laterally onto the cold, hot and warm water sources, so as to monitor the temperature value of cold, hot and warm water sources, and drive the actuating axle of the motor. When the temperature of the hot water source is A° C., that of the warm water source is B° C. and that of the cold water source is C° C., the temperature under lukewarm water discharge state is bigger than B° C., but smaller than A° C.; the temperature under chilly water discharge state is bigger than C° C., but smaller than B° C.

In a preferred embodiment of the present invention, the flow deflector could be rotated manually in the event of failure of the motor.

In a preferred embodiment of the present invention, the regulating valve is also provided with a magnetic valve, which is set at discharge portion for controlling the on/off state.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

Figure 1:
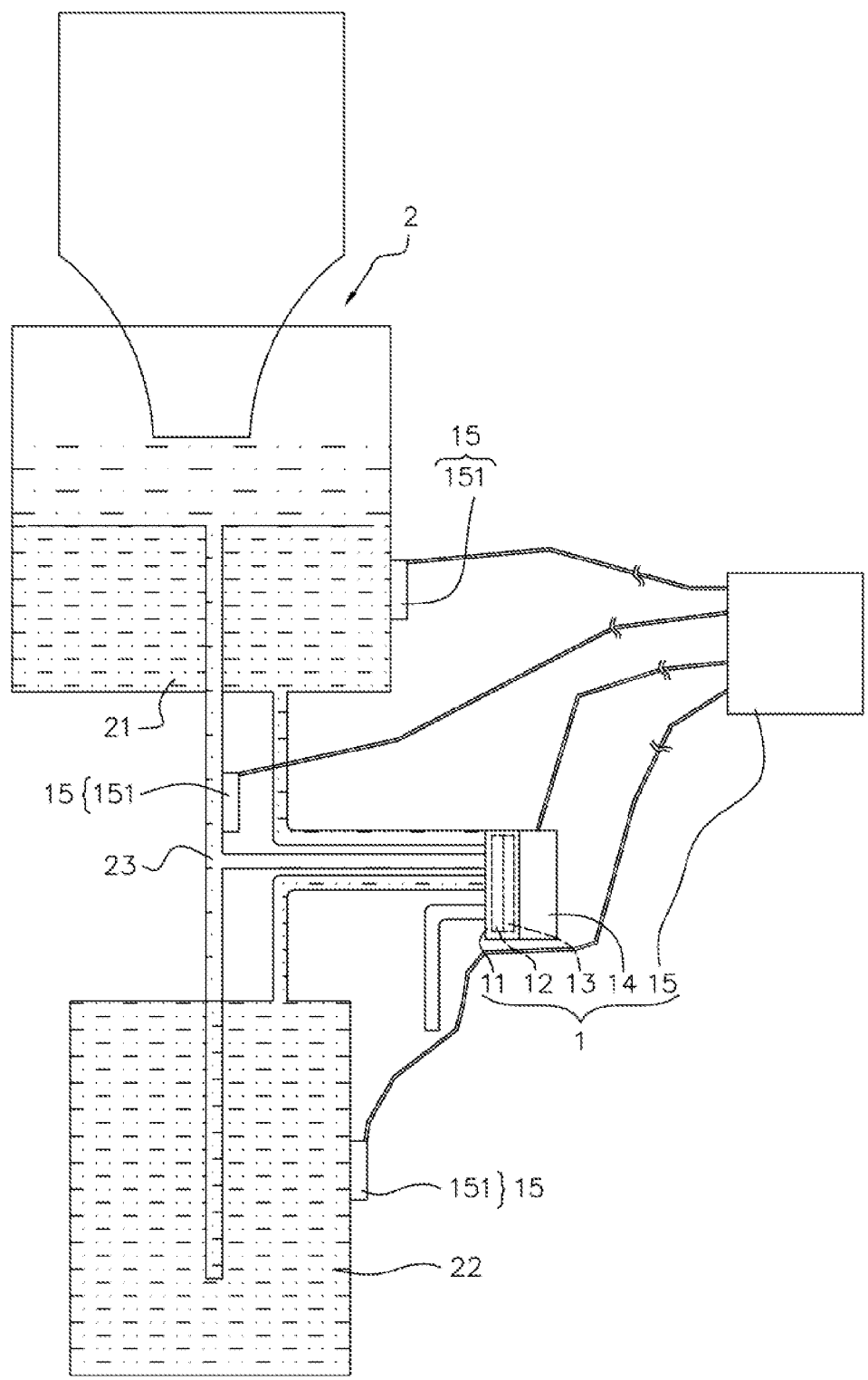
FIG. 1 is a schematic assembly view of the preferred embodiment of the present invention.
Figure 2:
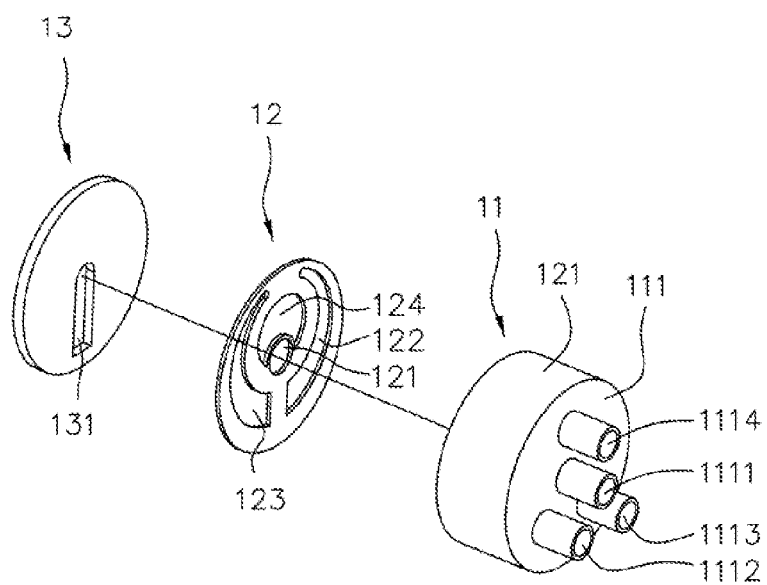
FIG. 2 is a first exploded perspective view of the preferred embodiment of the present invention.
Figure 3:
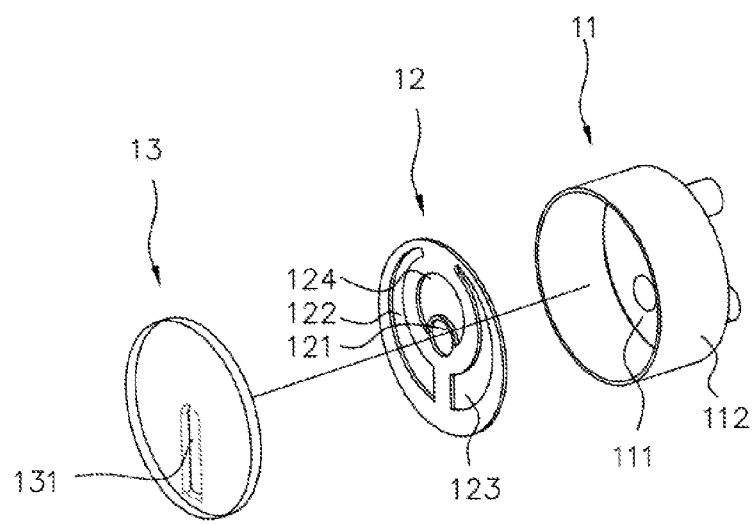
FIG. 3 is a second exploded perspective view of the preferred embodiment of the present invention.

The features and advantages of the present invention will be more readily understood with reference to the accompanying drawings:

FIGS. 1, 2 and 3 depict an assembly view and two exploded perspective views of the preferred embodiments of the present invention, wherein the regulating valve 1 is set into a water dispenser 2, which is provided with a cold water source 21, a hot water source 22 and a warm water source 23. The regulating valve 1 is connected separately with a cold water source 21, a hot water source 22 and a warm water source 23, so as to switch the yielding water temperature. The regulating valve 1 comprises of a dome 11, a discharge sheet 12 and a flow deflector 13.

Of which, the dome 11 comprises of a base 111, which is made of a round sheet provided with a discharge portion 1111, a cold water portion 1112, a hot water portion 1113 and a warm water portion 1114. The discharge portion 1111 is set at the center of the base 111, while the cold water portion 1112, hot water portion 1113 and warm water portion 1114 are separately set on the periphery of the discharge portion 1111. Moreover, the cold water portion 1112 is connected correspondingly with the cold water source 21, the hot water portion 1113 connected correspondingly with the hot water source 22, and the warm water portion 1114 connected correspondingly with the warm water source 23. A circumferential wall 112 is set around the base 111 such that a holding space is formed within the dome 11.

The discharge sheet 12 is set in the holding space of the dome 11 and attached closely to the base 111. A discharge slot 121, a cold water slot 122, a hot water slot 123 and a warm water slot 124 are separately set on the discharge sheet 12 correspondingly to the discharge portion 1111, the cold water portion 1112, the hot water portion 1113 and the warm water portion 1114. It is worthy to note that, in order to adjust the water temperature, the discharge slot 121 of the discharge sheet 12 is circularly set opposite to the discharge portion 1111, while the cold water slot 122 and hot water slot 123 are arranged symmetrically at both sides of the discharge slot 121. Moreover, the cold water slot 122 and the hot water slot 123 are set in a sickle-shaped pattern facing the discharge slot 121, whilst the warm water slot 124 is set between the discharge slot 121, the cold water slot 122 and the hot water slot 123. The warm water slot 124 is set in a falcate pattern facing the discharge slot 121.

The flow deflector 13 is set in the holding space of the dome 11 and attached pivotally to the other side of the discharge sheet 12. A guide slot 131 is extended outwards from the center of the circle on the surface of the flow deflector 13. The end point of the center of the guide slot 131 is set correspondingly to the discharge slot 121.

It is worthy to note that, the regulating valve 1 of the present invention also comprises a step motor 14. An actuating axle of the step motor 14 is connected with the center of circle of the flow deflector 13, so as to drive electrically rotation of the flow deflector 13. Alternatively, the flow deflector 13 could be rotated manually. As the position of the rotated flow deflector 13 varies in relation to the discharge sheet 12, there may occur either of a water shutdown state, a hot water discharge state, a lukewarm water discharge state, a warm water discharge state, a chilly water discharge state and a cold water discharge state. In particular, a magnetic valve is set at the discharge portion 1111, allowing to control the on/off state, switch the water supply and prevent leakage due to imperfect mechanical tightness when switching the discharge state at various temperatures.

To control the discharge temperature of the present invention, the regulating valve 1 also comprises a control module 15, which is connected electrically with the motor 14. Said control module 15 is provided with a plurality of sensors 151, which are set laterally onto the cold water source 21, the hot water source 22 and the warm water source 23, so as to monitor the temperature value of the cold water source 21, hot water source 22 and warm water source 23, and drive the actuating axle of the step motor 14 for the rotation of the flow deflector 13. For instance, when the temperature A of the hot water source 22 is 100° C., the temperature B of the warm water source 23 is 50° C. and the temperature C of the cold water source 21 is 0° C., the temperature under lukewarm water discharge state is 50° C.-100° C., and that under chilly water discharge state is 0° C.-50° C. If it is intended to obtain 70° C. lukewarm water, the flow deflector 13 could be rotated to adjust the lukewarm water discharge state, and re-balance quickly the water temperature to 70° C., thus reducing energy consumption required to maintain high or low water temperature.

Figure 4:
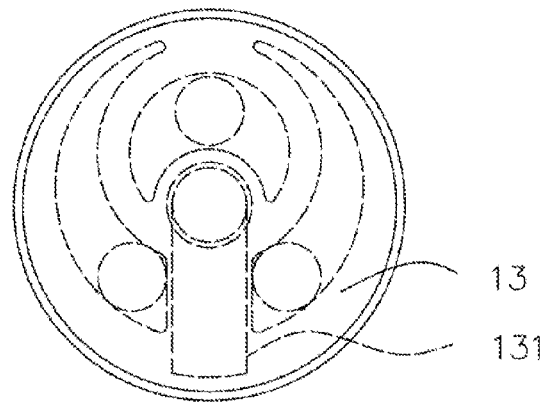
FIG. 4 is a first status view of the preferred embodiment of the present invention in operating condition.
Figure 5:
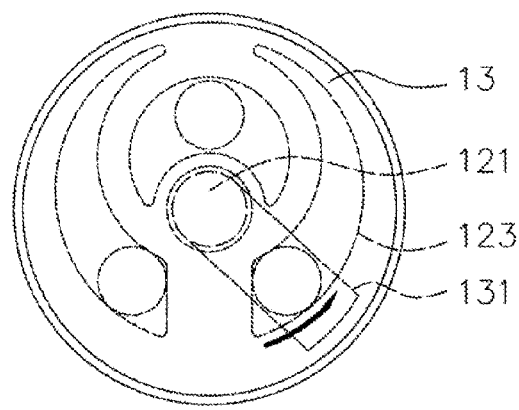
FIG. 5 is a second status view of the preferred embodiment of the present invention in operating condition.
Figure 6:
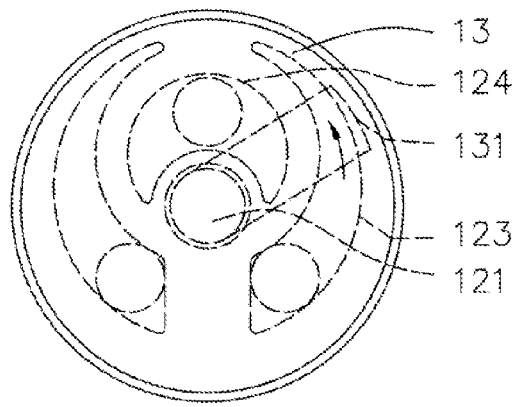
FIG. 6 is a third status view of the preferred embodiment of the present invention in operating condition.
Figure 7:
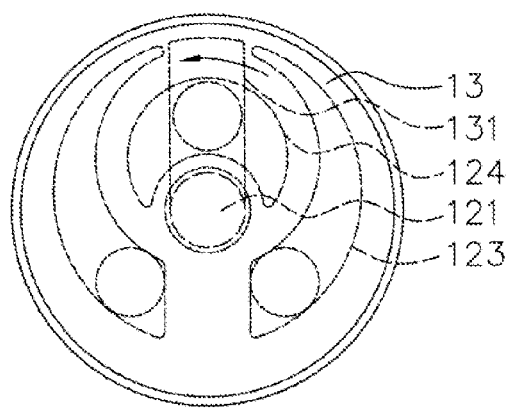
FIG. 7 is a fourth status view of the preferred embodiment of the present invention in operating condition.
Figure 8:
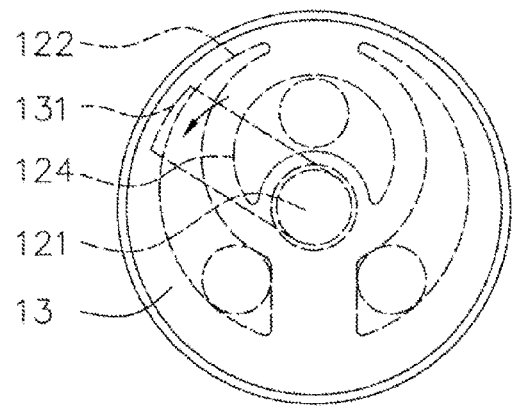
FIG. 8 is a fifth status view of the preferred embodiment of the present invention in operating condition.
Figure 9:
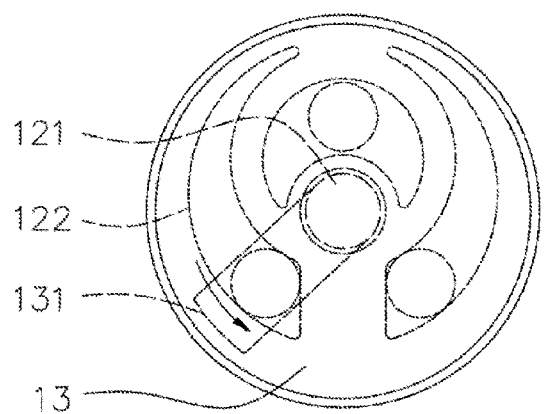
FIG. 9 is a sixth status view of the preferred embodiment of the present invention in operating condition.

FIGS. 4-9 depict the status views of the preferred embodiments of the present invention in operating conditions. Referring to FIGS. 4 and 5, when the flow deflector 13 is not rotated, the guide slot 131 is only connected with the discharge slot 121 to cause a water shutdown state. When the flow deflector 13 is rotated (counter-clockwise), the guide slot 131 is connected with the discharge slot 121 and the hot water slot 123 to cause hot water discharge state. In such a case, water shutdown state (shown in FIG. 4) is switched to hot water discharge state (shown in FIG. 5). The mating area X of the guide slot 131 and the hot water slot 123 increases gradually from 0, and the yielding water at temperature A (e.g.: 100° C.) is available. Referring to FIGS. 5 and 6, when the flow deflector 13 is rotated counter-clockwise from hot water discharge state to lukewarm water discharge state, the guide slot 131 is gradually connected with the discharge slot 121, warm water slot 124 and hot water slot 123. The mating area X of the guide slot 131 and the hot water slot 123 decreases gradually, meanwhile the mating area Y of the guide slot 131 and the warm water slot 124 increases gradually from 0, so the ratio of area X, Y could be adjusted to regulate the discharge temperature of lukewarm water from temperature A (e.g.: 100° C.) to temperature B (e.g.: 50° C.). Referring to FIG. 7, when the flow deflector 13 is continuously rotated (counter-clockwise), the mating area Y of the guide slot 131 and the discharge slot 121, the warm water slot 124 increases gradually to its maximum value, while the mating area Y of the guide slot 131 and the hot water slot 123 decreases to 0. In such a case, the guide slot 131 and the discharge slot 121 are only connected with the warm water slot 124, so the lukewarm water discharge state is switched to warm water discharge state, so yielding water at temperature B (e.g.: 50° C.) is available. Referring to FIGS. 7 and 8, when the flow deflector 13 is continuously rotated (counter-clockwise), the guide slot 131 and the discharge slot 121 are not only overlapped with the warm water slot 124, but also with the cold water slot 122, so warm water discharge state is switched to chilly water discharge state. Then, the mating area Y of the guide slot 131 and the warm water slot 124 starts to decrease gradually, and the mating area Z of the guide slot 131 and the cold water slot 122 starts to increase gradually, so yielding water at temperature B (e.g.: 50° C.) declines but that at temperature C (e.g.: 0° C.) grows. Referring to FIG. 9, when the flow deflector 13 is continuously rotated (counter-clockwise), the mating area Y of the guide slot 131 and the warm water slot 124 decreases gradually to 0, and the mating area Z of the guide slot 131 and the cold water slot 122 increases gradually to its maximum value. In such a case, the discharge slot 121 is connected with the cold water slot 122, such that yielding water at temperature C (e.g.: 0° C.) is available.

Similarly, the same effect could be realized when the flow deflector 13 is rotated clockwise, and the cold/hot/warm water sources could also be replaced by different drinks, e.g.: the cold water source is replaced by coffee, the hot water source replaced by green tea and warm water source replaced by warm milk. If it is intended to drink black coffee, the flow deflector 13 is rotated to cold water discharge state (shown in FIG. 9). If it is intended to drink milk, the flow deflector 13 is rotated to warm water discharge state (shown in FIG. 7). If it is intended to drink green tea, the flow deflector 13 is rotated to hot water discharge state (shown in FIG. 5). If it is intended to drink milk and coffee, the flow deflector 13 is rotated to chilly water discharge state (shown in FIG. 8). Furthermore, when the rotary position of the flow deflector 13 is regulated by pre-setting with the control module 15, the ratio of area Y and Z could be adjusted to obtain different drinks such as: Cappuccino and Latte. When the flow deflector 13 is rotated to lukewarm water discharge state (shown in FIG. 6), a cup of green tea Latte could be obtained, of which the percentage of milk and green tea could be preset.

The above is a detailed description of the technical features of the present invention based on a typical preferred embodiment. However, it should be appreciated that the present invention is capable of a variety of embodiments and various modifications by those skilled in the art, and all such variations or changes shall be embraced within the scope of the following claims.

I claim:

1. A regulating valve, which is set into a water dispenser and connected separately with a cold water source, a hot water source and a warm water source so as to switch the yielding water temperature; the regulating valve comprising:
    a dome comprising of:
        a base, made of a round sheet provided with a discharge portion, a cold water portion, a hot water portion and a warm water portion; the discharge portion is set at the center of the base, while the cold, hot and warm water portions are separately set on the periphery of the discharge portion; wherein, the cold water portion is connected correspondingly with the cold water source, the hot water portion is connected correspondingly with the hot water source, and the warm water portion is connected correspondingly with the warm water source;
        a circumferential wall, set around the base such that a holding space is formed;
    a discharge sheet, set in the holding space of the dome and attached closely to the base; a discharge slot, a cold water slot, a hot water slot and a warm water slot are separately set on the discharge sheet correspondingly to the discharge portion, the cold water portion, the hot water portion and the warm water portion; and
    a flow deflector, set in the holding space of the dome and attached pivotally to a side of the discharge sheet opposite of the base; wherein a guide slot is extended outwards from the center of a circle on the surface of the flow deflector; the end point of the guide slot at the center of the circle is set correspondingly to the discharge slot; when the flow deflector is rotated, there may occur either of a water shutdown state, a hot water discharge state, a lukewarm water discharge state, a warm water discharge state, a chilly water discharge state and a cold water discharge state.

2. The regulating valve of claim 1, wherein if the flow deflector is not rotated, the guide slot is only connected with the discharge slot to cause a water shutdown state; if the flow deflector is rotated, the guide slot is connected with the discharge slot and the hot water slot to cause a hot water discharge state; or if the flow deflector is rotated, the guide slot is connected with the discharge slot, the warm water slot and the hot water slot to cause a lukewarm water discharge state; or if the flow deflector is rotated, the guide slot is connected with the discharge slot and the warm water slot to cause a warm water discharge state; or if the flow deflector is rotated, the guide slot is connected with the discharge slot, the warm water slot and the cold water slot to cause a chilly water discharge state; or if the flow deflector is rotated, the guide slot is connected with the discharge slot and the cold water slot to cause a cold water discharge state.

3. The regulating valve of claim 2, wherein the discharge slot of the discharge sheet is circularly set opposite to the discharge portion, so the cold water slot and hot water slot are arranged symmetrically at both sides of the discharge slot; wherein, the cold and hot water slots are set in a sickle-shaped pattern; the warm water slot is set between the discharge slot, the cold water slot and the hot water slot, and the warm water slot is set in a falcate pattern.

4. The regulating valve of claim 3, wherein if the water shutdown state is switched to hot water discharge state, the mating area of the guide slot and the hot water slot increases gradually from 0; if the hot water discharge state is switched to the lukewarm water discharge state, the mating area of the guide slot and the hot water slot decreases gradually, meanwhile the mating area of the guide slot and the warm water slot increases gradually; if the lukewarm water discharge state is switched to the warm water discharge state, the mating area of the guide slot and the hot water slot decreases to 0, while the mating area of the guide slot and the warm water slot increases to maximum value; if the warm water discharge state is switched to the chilly water discharge state, the mating area of the guide slot and the warm water slot decreases gradually, whilst the mating area of the guide slot and the cold water slot increases gradually; if the chilly water discharge state is switched to cold water discharge state, the mating area of the guide slot and the warm water slot decreases to 0, whilst the mating area of the guide slot and the cold water slot increases to maximum value.

5. The regulating valve of claim 1, wherein said regulating valve also comprises a motor; an actuating axle of the motor is connected with the center of the circle of the flow deflector so as to drive electrically rotation of the flow deflector.

6. The regulating valve of claim 5, wherein said regulating valve also comprises a control module, which is connected electrically with the motor; the control module is provided with a plurality of sensors, which are set laterally onto the cold, hot and warm water sources, so as to monitor the temperature value of the cold, hot and warm water sources and drive the actuating axle of the motor.

7. The regulating valve of claim 6, wherein if the temperature of the hot water source is A° C., that of the warm water source is B° C. and that of the cold water source is C.° C., the temperature under lukewarm water discharge state is higher than B° C., but smaller than A° C.; and the temperature under chilly water discharge state is higher than C.° C., but smaller than B° C.

8. The regulating valve of claim 1, wherein the flow deflector is manually rotatable.

9. The regulating valve of claim 1, wherein said regulating valve is also provided with a magnetic valve, which is set at discharge portion for controlling the on/off state.

\* \* \* \* \*